United States Patent
Zhou

(10) Patent No.: US 7,675,551 B1
(45) Date of Patent: Mar. 9, 2010

(54) METHOD AND APPARATUS OBTAINING COLOR VALUES FOR A DIGITAL CAMERA

(75) Inventor: Jianping Zhou, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 326 days.

(21) Appl. No.: 11/751,080

(22) Filed: May 21, 2007

Related U.S. Application Data

(60) Provisional application No. 60/747,871, filed on May 22, 2006.

(51) Int. Cl.
*H04N 9/73* (2006.01)
(52) U.S. Cl. .................................. 348/223.1
(58) Field of Classification Search .............. 348/223.1, 348/224.1, 225.1; 382/167
See application file for complete search history.

(56) References Cited

U.S. PATENT DOCUMENTS

| | | | | |
|---|---|---|---|---|
| 5,296,935 A | * | 3/1994 | Bresler | 358/500 |
| 5,303,071 A | * | 4/1994 | Kakimura | 358/519 |
| 6,686,953 B1 | * | 2/2004 | Holmes | 348/179 |
| 2003/0142222 A1 | * | 7/2003 | Hordley | 348/223.1 |
| 2004/0114164 A1 | * | 6/2004 | Linder et al. | 358/504 |

* cited by examiner

*Primary Examiner*—Jason Whipkey
(74) *Attorney, Agent, or Firm*—Mirna G. Abyad; Wade J. Brady, III; Frederick J. Telecky, Jr.

(57) ABSTRACT

Digital camera color correction with a linear transformation having coefficients computed from an optimization with preservation of gray levels. This preserves white balance despite differing exposures for images from a target sensor and reference colors.

8 Claims, 5 Drawing Sheets

METHOD AND APPARATUS OBTAINING COLOR VALUES FOR A DIGITAL CAMERA

CROSS-REFERENCE TO RELATED APPLICATIONS

This application claims priority from provisional application No. 60/747,871, filed May 22, 2006. The following co-assigned copending patent applications disclose related subject matter: 11/741,753, filed Apr. 29, 2007.

BACKGROUND OF THE INVENTION

The present invention relates to digital video signal processing, and more particularly to architectures and methods for digital camera image pipeline.

Imaging and video capabilities have become the trend in consumer electronics. Digital cameras, digital camcorders, and video cellular phones are common, and many other new gadgets are evolving in the market. Advances in large resolution CCD/CMOS sensors coupled with the availability of low-power digital signal processors (DSPs) has led to the development of digital cameras with both high resolution image and short audio/visual clip capabilities. The high resolution (e.g., sensor with a 2560×1920 pixel array) provides quality offered by traditional film cameras.

FIG. 2a is a typical functional block diagram for digital camera control and image processing (the "image pipeline"). The automatic focus, automatic exposure, and automatic white balancing are referred to as the 3A functions; and the image processing includes functions such as color filter array (CFA) interpolation, gamma correction, white balancing, color space correction and conversion, and JPEG/MPEG compression/decompression (JPEG for single images and MPEG for video clips). Typical digital cameras provide a capture mode with full resolution image or audio/visual clip processing plus compression and storage, a preview mode with lower resolution processing for immediate display, and a playback mode for displaying stored images or audio/visual clips.

The usual camera has a color CCD or CMOS sensor which includes a rectangular array of photosites (pixels) with each photosite covered by a filter (the color filter array, or CFA). The filter colors may be red, green, or blue (RGB). In the commonly-used Bayer pattern CFA one-half of the photosites are green, one-quarter are red, and one-quarter are blue.

However, the RGB color values obtained from a camera sensor are device-dependent. Thus there is a need to characterize these values in a device-independent fashion and provide a color correction (RGB-to-RGB color correction). For simplicity, common methods presume a linear transformation to perform the color correction:

$$\begin{bmatrix} R' \\ G' \\ B' \end{bmatrix} = \begin{bmatrix} M_{11} & M_{12} & M_{13} \\ M_{21} & M_{22} & M_{23} \\ M_{31} & M_{32} & M_{33} \end{bmatrix} \begin{bmatrix} R \\ G \\ B \end{bmatrix} + \begin{bmatrix} O_1 \\ O_2 \\ O_3 \end{bmatrix}$$

The problem translates to finding the transformation matrix ($M_{i,j}$) and the offset vector ($O_j$). Note that the diagonal matrix elements, $M_{kk}$, are typically in the range from 0.5 to 2.0, and that the off-diagonal elements are typically in the range −0.5 to +0.5.

One known approach performs a least-squares optimization without any constraint; see Vrhel, M. J. and Trussell, H. J., Optimal Scanning Filters Using Spectral Reflectance Information, Proc. SPIE Int. Soc. Opt. Eng. 1913, pp. 404-412 (1993). This approach treats all colors equally, and the resulting transform usually loses white balance. However, human eyes are very sensitive to white balance in a color image.

Another known approach uses a white-preserving constraint in the optimization; see Finlayson, G. D. and Drew, M. S., Constrained Least-Squares Regression in Color Spaces, Journal of Electronic Imaging 6(4), pp. 484-493 (1997). This approach keeps white balance and the white point remains unchanged after the transform. This requires that source data and reference data have the same exposure values. However, source data and reference data usually have different exposure values, and exposure information is either unavailable or inaccurate. An exposure value difference leads to larger color errors.

Thus there is a problem with known color correction methods, and with camera tuning tools which incorporate color correction/conversion.

SUMMARY OF THE INVENTION

The present invention provides color correction by linear transformation optimization with gray preservation plus normalization.

DESCRIPTION OF THE PREFERRED EMBODIMENTS

1. Overview

Figure 1:
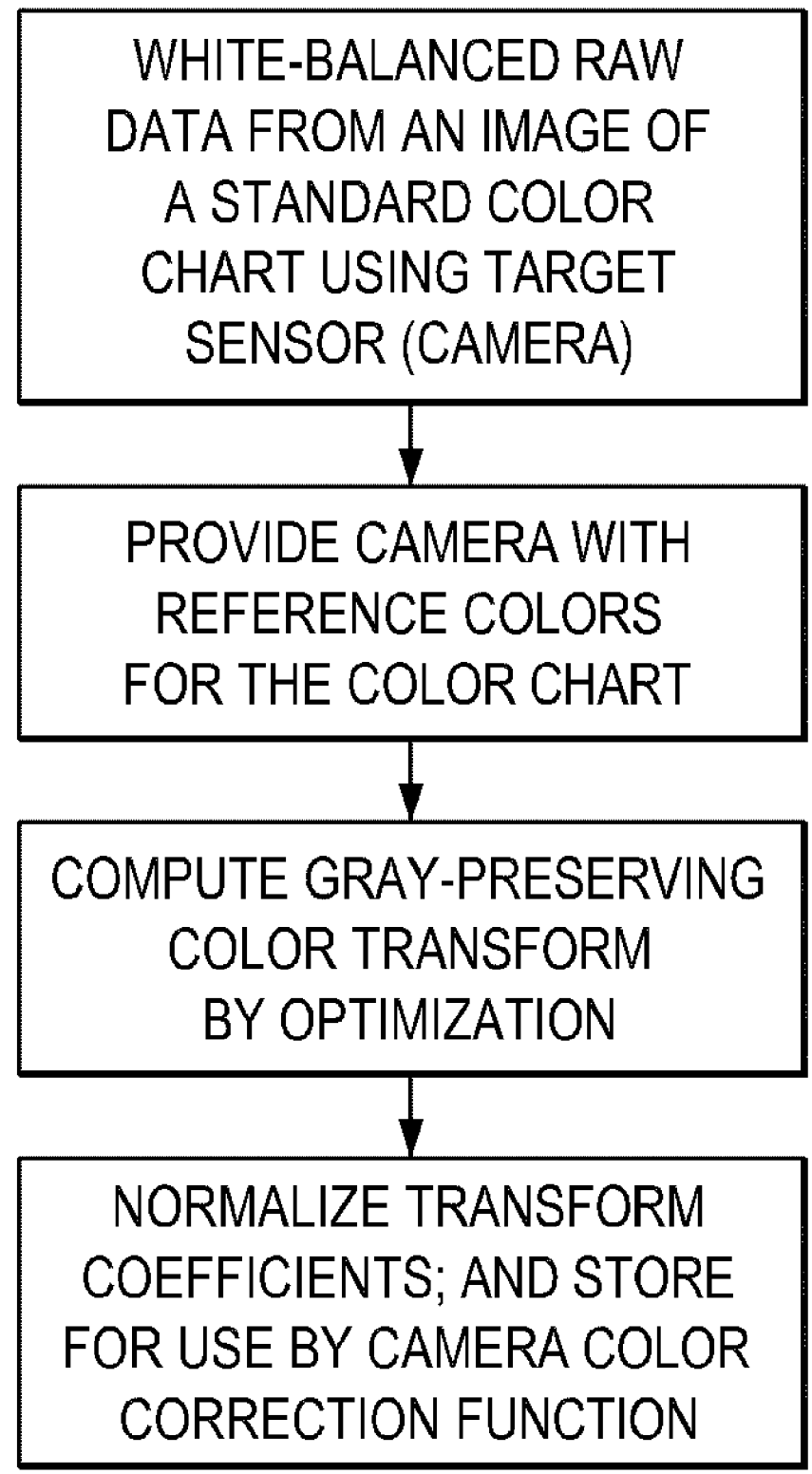
FIG. 1 is a flowchart.

Preferred embodiment image color correction methods optimize (least squares) with a gray-preserving transformation and normalize; this allows for differing exposures between images from the target sensor and the color reference. The preferred embodiments have the features of:

a) Preserves white balancing.

b) Does not need to have or estimate exposure value information.

c) Achieves minimum mean errors within the white-preserving constraint. FIG. 1 is a flowchart for a preferred embodiment setting or tuning of the color correction/conversion function of a camera.

Figure 2A:
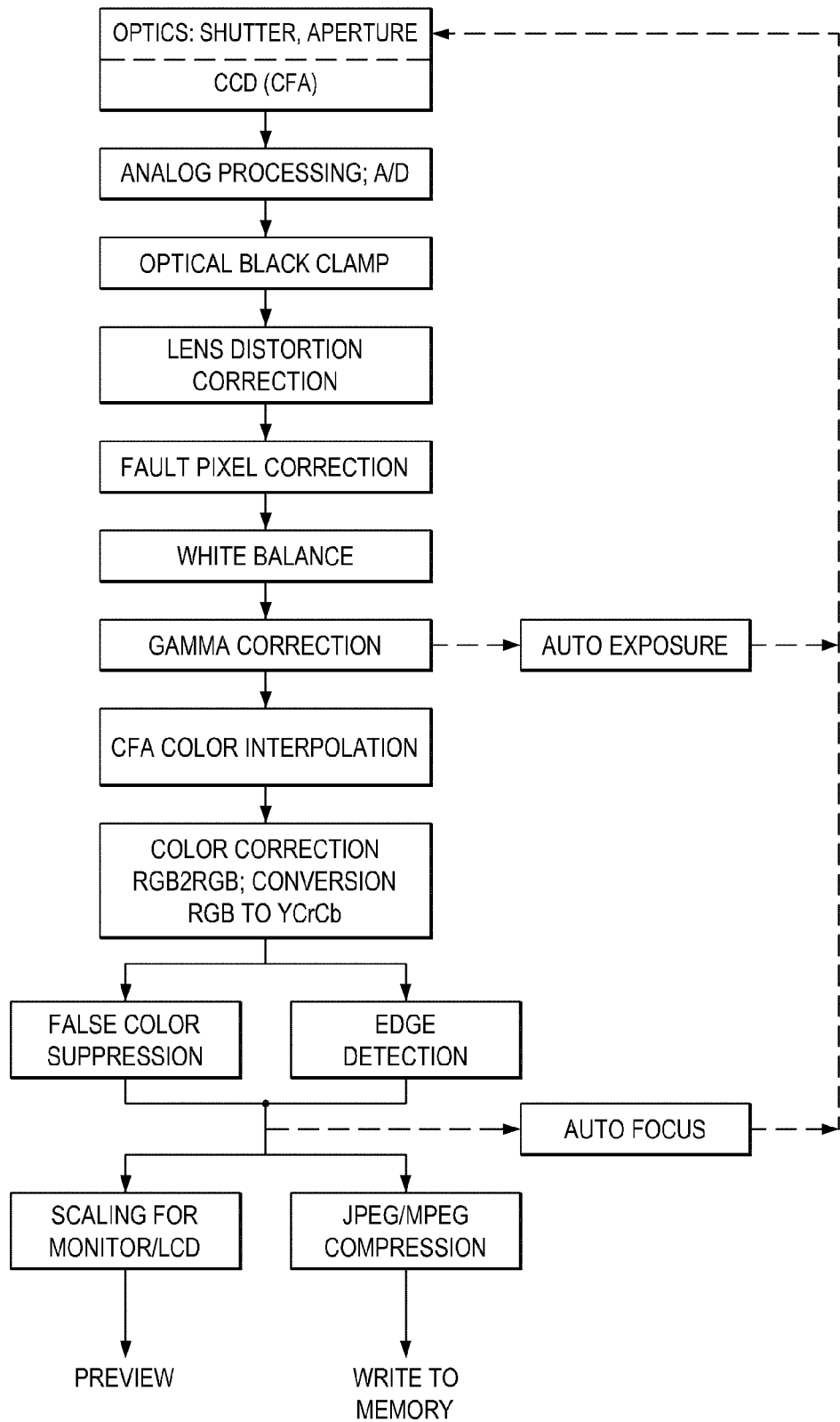
FIGS. 2a-2c illustrate known image pipeline, camera processor, and network communication.
Figure 2B:
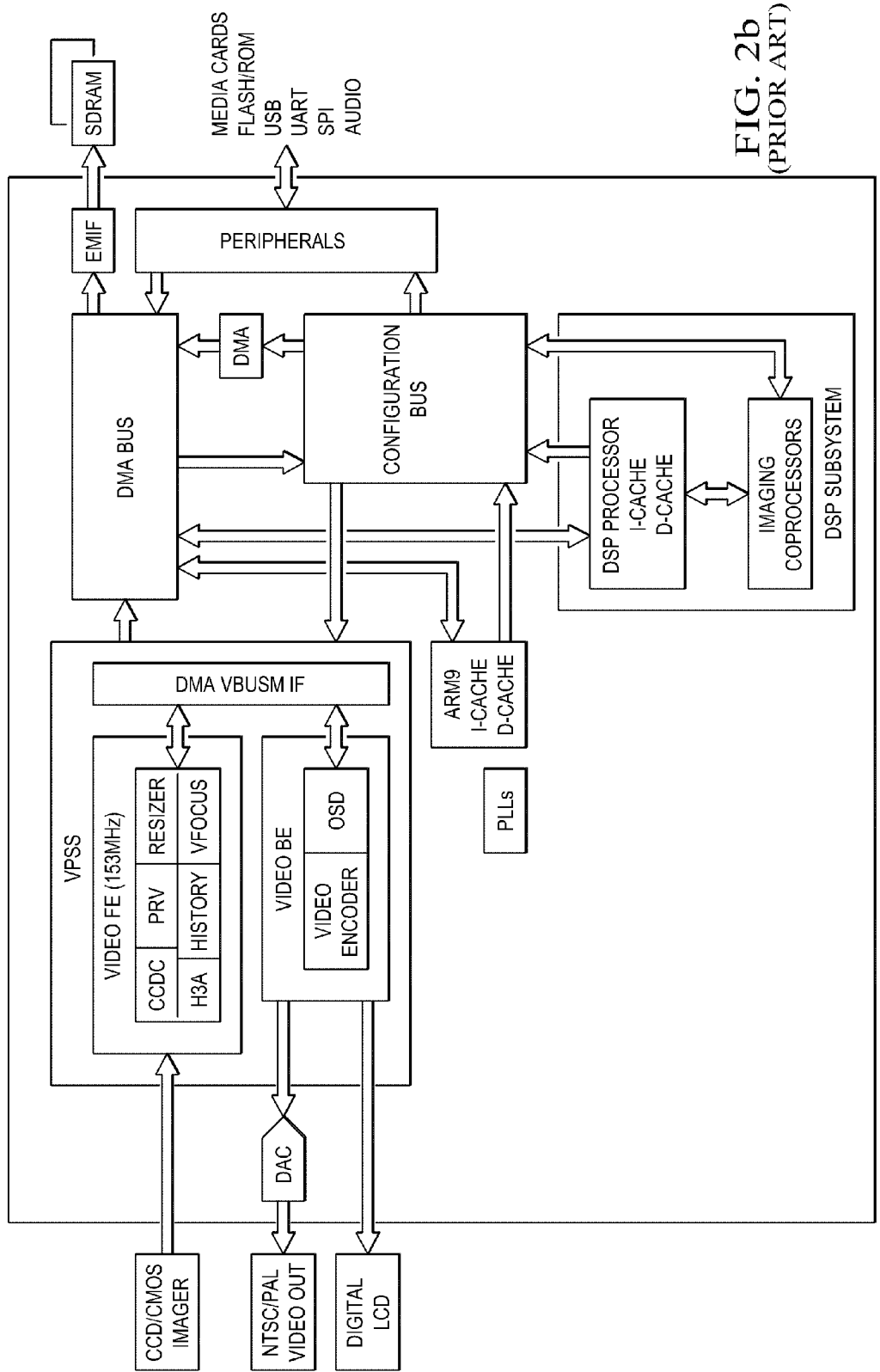
Figure 2C:
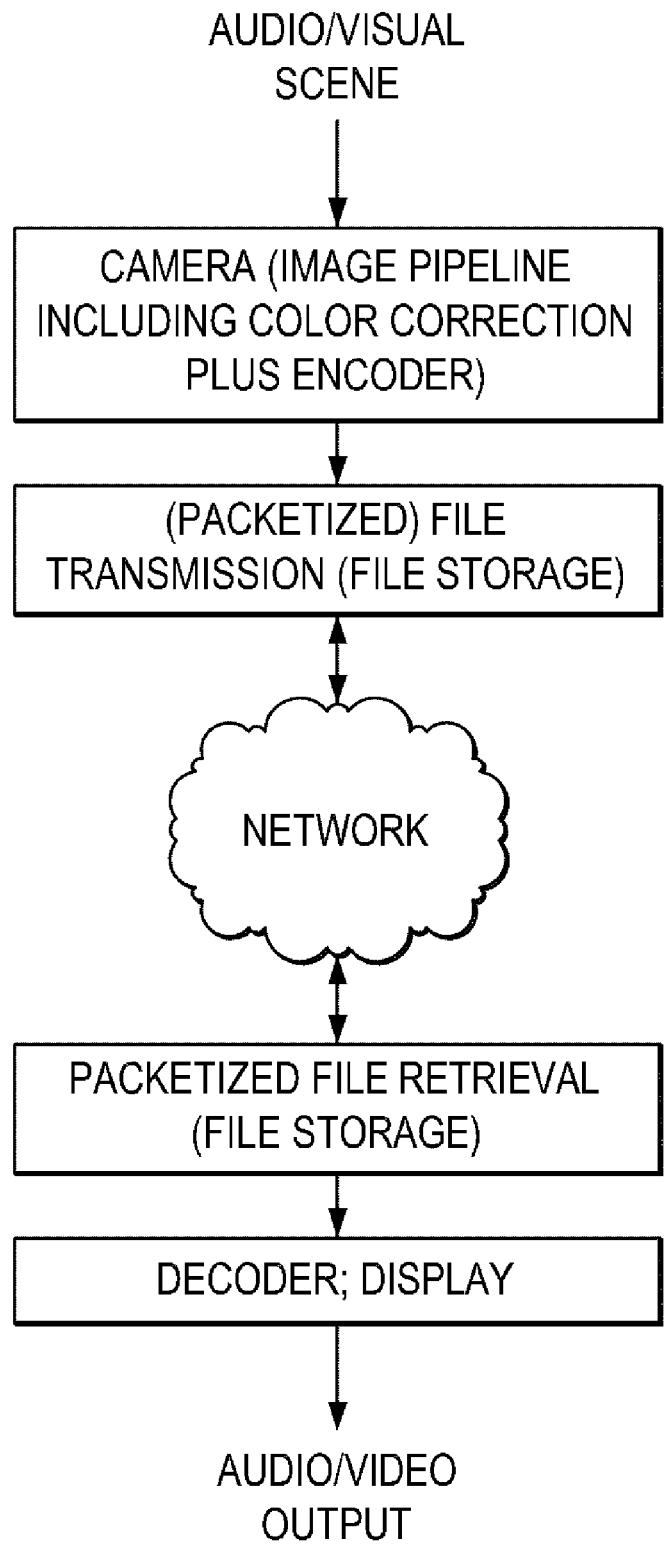

Preferred embodiment systems (camera phones, digital still cameras, camcorders, et cetera) perform preferred embodiment methods with any of several types of hardware: digital signal processors (DSPs), general purpose programmable processors, application specific circuits, or systems on a chip (SoC) such as combinations of a DSP and a RISC processor together with various specialized programmable accelerators. FIG. 2b is an example of digital camera hardware. A stored program in an onboard or external (flash EEP) ROM or FRAM could implement the signal processing. Analog-to-digital converters and digital-to-analog converters can provide coupling to the real world, modulators and demodulators (plus antennas for air interfaces) can provide coupling for transmission waveforms, and packetizers can provide formats for transmission over networks such as the Internet; see FIG. 2c.

2. First Preferred Embodiment

The first preferred embodiment color correction methods initially take photos of some standard color charts, such as the Macbeth Colorchecker chart, using the camera sensor which is to be corrected. After white balancing, this yields a set of raw RGB color values from the image. Next, either use a set of standard RGB values or compute a set of RGB values from a reference image as reference color data. Then optimize the difference between the source RGB color values and the reference RGB color values with the gray-preserving constraint that gray points are still gray after transformation. The constrained optimization problem is formulated as follows with a set of N color values $$\text{Minimize } f(M, O) = \sum_{1 \le n \le N} \sum_{1 \le i \le 3} \left[ \left( \sum_{1 \le j \le 3} M_{i,j} RGB_{j,n} \right) + O - RGB_{i,n}^{ref} \right]^2$$

$$= \sum_{1 \le n \le N} \left[ (R'_n - R_n^{ref})^2 + (G'_n - G_n^{ref})^2 + (B'_n - B_n^{ref})^2 \right]$$

$$\text{Subject to } \sum_{1 \le j \le 3} M_{1,j} = \sum_{1 \le j \le 3} M_{2,j} = \sum_{1 \le j \le 3} M_{3,j}$$

where $RGB_{j,n}$ denotes the jth component of the nth input RGB vector and $RGB^{ref}_{j,n}$ denotes the jth component of the nth reference. Note that for simplicity this formulation takes the offset vector to have equal components: $O_1=O_2=O_3=O$. This optimization problem can be reformulated as many equivalent unconstrained problems. The following two example equivalent unconstrained problems do not exhaust the possibilities.

$$\text{Minimize } f(M_{11}, M_{12}, M_{13}, M_{21}, M_{22}, M_{31}, M_{32}, O) =$$

$$\sum_{1 \le n \le N} \left\{ \left[ \left( \sum_{1 \le j \le 3} M_{1,j} RGB_{j,n} \right) + O - RGB_{1,n}^{ref} \right]^2 + \right.$$

$$\left[ \left( \sum_{1 \le j \le 2} M_{2,j} RGB_{j,n} \right) + (M_{11} + M_{12} + M_{13} - M_{21} - M_{22})RGB_{3,n} + O - RGB_{2,n}^{ref} \right]^2 +$$

$$\left. \left[ \left( \sum_{1 \le j \le 2} M_{3,j} RGB_{j,n} \right) + (M_{11} + M_{12} + M_{13} - M_{31} - M_{32})RGB_{3,n} + O - RGB_{3,n}^{ref} \right]^2 \right\}$$

or $$\text{Minimize } j(M_{11}, M_{12}, M_{21}, M_{22}, M_{31}, M_{32}, C, O) = \Sigma_{1 \le n \le N} \Sigma_{1 \le i \le 3} [\Sigma_{1 \le j \le 2}(M_{i,j} RGB_{j,n}) + (C - M_{i,1} - M_{i,2})RGB_{3,n} + O - RGB^{ref}_{i,n}]^2$$

This optimization problem has a unique close-form solution, despite different formulations. In particular, computing the eight partial derivatives of f gives a system of eight linear equations for the eight variables to find minimum points where the eight partial derivatives all vanish. For example, with the second formulation:

$$\partial f / \partial M_{11} =$$

$$2 \sum_{1 \le n \le N} \left[ \sum_{1 \le j \le 2} (M_{1,j} RGB_{j,n}) + (C - M_{11} - M_{12})RGB_{3,n} + O - RGB_{1,n}^{ref} \right]$$

$$(RGB_{1,n} - RGB_{3,n}) \partial f / \partial C =$$

$$2 \sum_{1 \le n \le N} \left[ \sum_{1 \le j \le 2} (M_{1,j} RGB_{j,n}) + (C - M_{11} - M_{12})RGB_{3,n} + O - RGB_{1,n}^{ref} \right]$$

$$(RGB_{3,n})$$

and so forth. Of course, if the three components of the offset vector are not equal, then there would be ten variables and ten linear equations for the minimization.

After computing the optimal transformation matrix ($M_{i,j}$) and the offset vector ($O_j$), normalize them:

$$M_{i,j} = M_{i,j}/(M_{11}+M_{12}+M_{13})$$

$$O = O/(M_{11}+M_{12}+M_{13})$$

Recall the constraint is $(M_{11}+M_{12}+M_{13})=(M_{21}+M_{22}+M_{23})=(M_{31}+M_{32}+M_{33})$, so the normalization is not singling out the first row vector of the correction matrix. Also, the diagonal matrix elements dominate, so the sum $M_{11}+M_{12}+M_{13}$ is positive and the division well-defined. The resulting transformation is white-preserving.

For the special case without an (or zero) offset vector, the optimization problem is reformulated as:

$$\text{Minimize } f(M) = \sum_{1 \le n \le N} \sum_{1 \le i \le 3} \left[ \left( \sum_{1 \le j \le 3} M_{i,j} RGB_{j,n} \right) - RGB_{i,n}^{ref} \right]^2$$

$$= \sum_{1 \le n \le N} \left[ (R'_n - R_n^{ref})^2 + (G'_n - G_n^{ref})^2 + (B'_n - B_n^{ref})^2 \right]$$

$$\text{Subject to } \sum_{1 \le j \le 3} M_{1,j} = \sum_{1 \le j \le 3} M_{2,j} = \sum_{1 \le j \le 3} M_{3,j}$$

This optimization problem also has a close-form solution from seven linear equations for the seven linearly independent variables of the nine matrix elements. Again, after computing the optimal transformation matrix ($M_{i,j}$), normalize it:

$$M_{i,j}=M_{i,j}/(M_{11}+M_{12}+M_{13})$$

The resulting transformation is also white-preserving. Thus the preferred embodiment methods first obtain an optimal solution under the gray-preserving constraint and then normalize it. In this optimization, the source data and reference data can have completely different exposure values.

Thus for setting or tuning the color correction matrix values, $M_{i,j}$, for a particular digital camera, a preferred embodiment method using the 24 Macbeth standard colors includes the following steps:

(a) Provide the 24 Macbeth reference colors in camera memory; e.g., each of the reference colors corresponds to a 3-component vector of 8-bit (0-255) $R^{ref}$, $G^{ref}$, and $B^{ref}$ values. These are the ideal R, G, and B values which an ideal display would use to reproduce each of the reference colors.

Figure 3A:
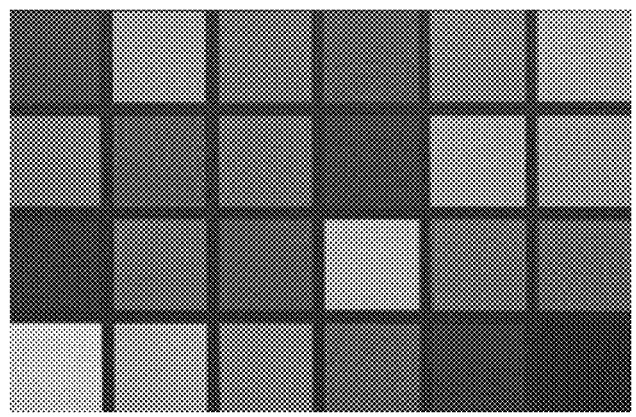
FIGS. 3a-3c show experimental results.
Figure 3B:
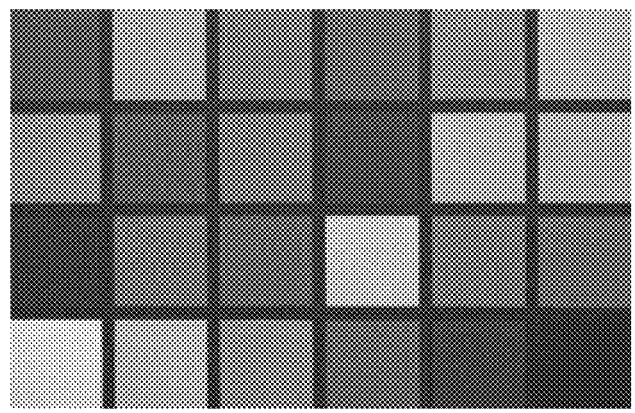
Figure 3C:
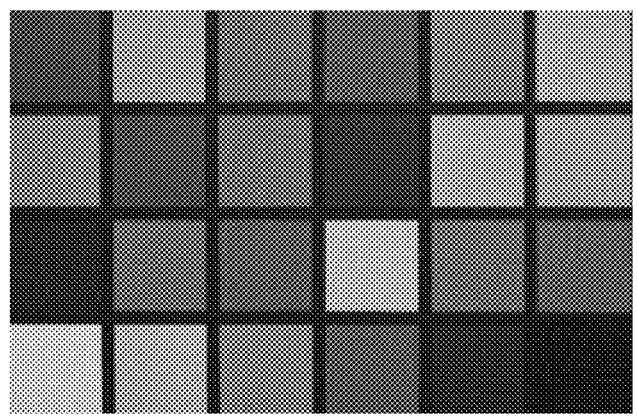

(b) Use the camera to capture an image of the 6×4 Macbeth reference color chart (e.g., FIG. 3c is the scene); an analysis program in the camera can scan the captured image and extract the R, G, and B values actually captured for each of the standard colors (e.g., FIG. 3a).

(c) Apply the foregoing optimization to compute the color correction matrix elements, $M_{i,j}$, and offset vector components, $O_i$, and store in the camera memory for subsequent use by the RGB-to-RGB function (e.g., to make corrections such as captured FIG. 3a to corrected FIG. 3b).

Also, the same computation of correction matrix elements and offset vector values can be applied to update (retune) the color correction function of cameras already in use.

3. Experimental Results

FIGS. 3a-3c show an example of application of a preferred embodiment color correction method. FIG. 3a is a captured image of a 6×4 array of Macbeth reference colors before color correction, and FIG. 3b is after application of the color correction with color correction matrix elements and offsets computed using a preferred embodiment method. For comparison, FIG. 3c shows a reference image (i.e., the image captured by the camera).

4. Modifications

The preferred embodiments may be modified in various ways while retaining the feature of a gray-preserving optimization for color correction.

For example, the sensor and CFA may be for complementary colors (YMCG) or other color spaces rather than RGB with corresponding changes in the preferred embodiments. Optimizations other than least squares could be used, although approximation rather than closed form results may arise.

What is claimed is:

1. Image color correction method for a camera, comprising the steps of:
   (a) providing a plurality of reference color values;
   (b) providing color images captured by a camera of said plurality of reference colors;
   (c) computing gray-preserving coefficients for an optimized color correction transformation of color values of said captured images into corresponding ones of said reference color values, wherein said transformation is of the form:

$$\begin{bmatrix} R' \\ G' \\ B' \end{bmatrix} = \begin{bmatrix} M_{11} & M_{12} & M_{13} \\ M_{21} & M_{22} & M_{23} \\ M_{31} & M_{32} & M_{33} \end{bmatrix} \begin{bmatrix} R \\ G \\ B \end{bmatrix} + \begin{bmatrix} O_1 \\ O_2 \\ O_3 \end{bmatrix}, \text{ and}$$

wherein R', G', B' are ideal R, G, B values and wherein M and O relate to optimal transformation matrix and the offset vector, respectively and wherein said gray-preserving is the constraint $\Sigma_{1\le j\le 3}M_{1,j}=\Sigma_{1\le j\le 3}M_{2,j}=\Sigma_{1\le j\le 3}M_{3,j}$; and
   (d) setting a color correction function of said camera with said coefficients.

2. The method of claim 1, wherein said computing to find optimized $M_{ij}$ and $O_i$ is by least squares.

3. The method of claim 1, wherein said computing to find optimized $M_{ij}$ and $O_i$ includes normalization:

$$M_{i,j}=M_{i,j}/(M_{11}+M_{12}+M_{13})$$

$$O=O/(M_{11}+M_{12}+M_{13}).$$

4. The method of claim 1, wherein said reference colors relate to a standard color chart.

5. A digital camera with color correction, comprising:
   (i) an image sensor;
   (ii) an image pipeline coupled to said sensor, said image pipeline comprising:
      (a) means for providing a plurality of reference color values;
      (b) means for providing color images captured by said sensor of said plurality of reference colors;
      (c) means for computing gray-preserving coefficients for an optimized color correction transformation of color values of said captured images into corresponding ones of said reference color values, wherein said transformation is of the form:

$$\begin{bmatrix} R' \\ G' \\ B' \end{bmatrix} = \begin{bmatrix} M_{11} & M_{12} & M_{13} \\ M_{21} & M_{22} & M_{23} \\ M_{31} & M_{32} & M_{33} \end{bmatrix} \begin{bmatrix} R \\ G \\ B \end{bmatrix} + \begin{bmatrix} O_1 \\ O_2 \\ O_3 \end{bmatrix}, \text{ and}$$

wherein R', G', B' are ideal R, G, B values and wherein M and O relate to optimal transformation matrix and the offset vector, respectively, and wherein said gray-preserving is the constraint $\Sigma_{1\le j\le 3}M_{1,j}=\Sigma_{1\le j\le 3}M_{2,j}=\Sigma_{1\le j\le 3}M_{3,j}$; and (d) means for setting said color correction function of said camera with said coefficients.

6. The camera of claim 5, wherein said means for computing is utilized to find optimized $M_{ij}$ and $O_i$ is by least squares.

7. The camera of claim 6, wherein said means for computing is utilized to find optimized $M_{ij}$ and $O_i$ includes normalization:

$$M_{i,j}=M_{i,j}/(M_{11}+M_{12}+M_{13})$$

$$O=O/(M_{11}+M_{12}+M_{13}).$$

8. The camera of claim 5, wherein said reference colors relate to a standard color chart.

* * * * *